United States Patent
Gilstrap et al.

(10) Patent No.: US 7,168,007 B2
(45) Date of Patent: Jan. 23, 2007

(54) FIELD REPLACEABLE UNIT (FRU) IDENTIFICATION SYSTEM TOOL

(75) Inventors: Raymond J. Gilstrap, Milpitas, CA (US); Steven E. Weiss, San Diego, CA (US); Gregory S. Jumper, Menlo Park, CA (US); Ira K. Weiny, San Jose, CA (US); Krishna Mohan, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 637 days.

(21) Appl. No.: 10/413,036

(22) Filed: Apr. 14, 2003

(65) Prior Publication Data

US 2004/0078634 A1    Apr. 22, 2004

Related U.S. Application Data

(60) Provisional application No. 60/381,130, filed on May 17, 2002, provisional application No. 60/381,116, filed on May 17, 2002, provisional application No. 60/381,386, filed on May 17, 2002, provisional application No. 60/381,131, filed on May 17, 2002, provisional application No. 60/381,399, filed on May 17, 2002, provisional application No. 60/381,400, filed on May 17, 2002.

(51) Int. Cl.
*G06F 11/00* (2006.01)

(52) U.S. Cl. ............... 714/37; 714/27; 714/47

(58) Field of Classification Search .......... 714/27, 714/37, 47
See application file for complete search history.

(56) References Cited

U.S. PATENT DOCUMENTS 5,068,851 A    11/1991    Bruckert et al.

(Continued)

FOREIGN PATENT DOCUMENTS

EP        623 900        11/1994

(Continued)

OTHER PUBLICATIONS

Hewlett Packard, White Paper, "IPMI: Intelligent Platform Management Interface," Feb. 1998, 5 pages.

(Continued)

*Primary Examiner*—Scott Baderman
*Assistant Examiner*—Tim Bonura

(74) *Attorney, Agent, or Firm*—Lawrence J. Merkel; Meyertons, Hood, Kivlin, Kowert & Goetzel, P.c.

(57) ABSTRACT

A method includes interfacing with a field replaceable unit (FRU) having a memory device configured to store a FRUID image including at least status data. The status data is extracted from the memory device. Repair information associated with a repair of the field replaceable unit is received. The repair information is stored in the memory device. A system includes a field replaceable unit (FRU) and a FRU tool. The FRU includes a memory device configured to store a FRUID image including at least status data. The FRU tool is configured to interface with the FRU, extract the status data from the memory device, receive repair information associated with a repair of the field replaceable unit, and store the repair information in the memory device.

24 Claims, 5 Drawing Sheets

U.S. PATENT DOCUMENTS

| | | | |
|---|---|---|---|
| 5,253,184 | A | 10/1993 | Kleinschnitz |
| 5,293,556 | A | 3/1994 | Hill et al. |
| 5,404,503 | A | 4/1995 | Hill et al. |
| 5,530,946 | A | 6/1996 | Bouvier et al. |
| 5,552,999 | A | 9/1996 | Polgreen et al. |
| 5,761,413 | A | 6/1998 | Frank et al. |
| 5,784,624 | A | 7/1998 | Douglass et al. |
| 5,794,065 | A | 8/1998 | Hatakeyama et al. |
| 5,867,809 | A | 2/1999 | Soga et al. |
| 5,961,215 | A | 10/1999 | Lee et al. |
| 6,016,758 | A | 1/2000 | Tomita |
| 6,058,052 | A | 5/2000 | Steadman |
| 6,070,253 | A | 5/2000 | Tavallaei et al. |
| 6,154,728 | A | 11/2000 | Sattar et al. |
| 6,198,245 | B1 | 3/2001 | Du et al. |
| 6,199,173 | B1* | 3/2001 | Johnson et al. ............... 714/4 |
| 6,249,838 | B1 | 6/2001 | Kon |
| 6,289,735 | B1 | 9/2001 | Dister et al. |
| 6,308,289 | B1 | 10/2001 | Ahrens et al. |
| 6,349,268 | B1 | 2/2002 | Ketonen et al. |
| 6,415,395 | B1 | 7/2002 | Varma et al. |
| 6,425,055 | B1 | 7/2002 | Sager et al. |
| 6,519,552 | B1 | 2/2003 | Sampath et al. |
| 6,658,586 | B1 | 12/2003 | Levi |
| 6,665,822 | B1* | 12/2003 | Conway ..................... 714/47 |
| 6,684,180 | B1 | 1/2004 | Edwards et al. |
| 6,708,297 | B1* | 3/2004 | Bassel ......................... 714/47 |
| 6,718,489 | B1* | 4/2004 | Lee et al. .................... 714/43 |
| 6,738,748 | B1 | 5/2004 | Wetzer |
| 6,742,145 | B1 | 5/2004 | Bailey et al. |
| 6,789,214 | B1 | 9/2004 | De Bonis-Hamelin et al. |
| 6,892,159 | B1 | 5/2005 | Weiss et al. |
| 6,920,519 | B1 | 7/2005 | Beukema et al. |
| 2002/0053047 | A1* | 5/2002 | Gold ........................... 714/45 |
| 2002/0169871 | A1 | 11/2002 | Cravo de Almeida, et al. |
| 2003/0084381 | A1* | 5/2003 | Gulick ........................ 714/47 |
| 2003/0167273 | A1 | 9/2003 | Alexander, et al. |

FOREIGN PATENT DOCUMENTS

WO     WO 03/014752     2/2003

OTHER PUBLICATIONS

Intel, Hewlett-Packard, NEC, Dell, "-IPMI- Platrform Event Trap Format Specification," v1.0, Revision 1.0, Dec. 7, 1998, 17 pages.
Intel, Hewlett-Packard, NEC, Dell, "-IPMI- IPMB v1.0 Address Allocation," Revision 1.0, Sep. 16, 1998, 5 pages.
Intel, Hewlett-Packard, NEC, Dell, "-IPMI- Platrform Management FRU Information Storage Definition," v1.0, Revision 1.1, Sep. 27, 1999, 27 pages.
Atmel Corporation, "2-Wire Serial EEPROM," Rev. 03361-SEEPR-Jul. 2002, 19 pages.
Atmel Corporation, "Interfacing 24CXX Serial EEPROMs," Rev. 0507D-May 2001, 3 pages.
Atmel Corporation, "Atmel's Serial EEPROMs, Solutions for all your design needs," Jan. 1999, 7 pages.
IDEAS International Pty., Ltd., "Sun-ft-SPARC," Competitive Profiles, Jan. 27, 1999, 2 pages.
Sun Microsystems, Inc., "Netra ft 1800 Module EEPROM v.4 Data File Specifications," 1998, 56 pages.
Sun Microsystems, Inc., "Netra ft 1800 Module EEPROM v.4 Data File Specifications, Repair and Reference Fields," 1998, 32 pages.
Sun Microsystems, Inc., "Netra ft 1800 Module EEPROM v.4 Data File Specifications, RMM-Specific Data," 1998, 4 pages.
Sun Microsystems, Inc., "Netra ft 1800 Module EEPROM v.4 Data File Specifications, PCI Card-Specific Data," 1998, 4 pages.
Sun Microsystems, Inc., "Netra ft 1800 Module EEPROM v.4 Data File Specifications, Disk Chassis-Specific Data," 1998, 4 pages.
Sun Microsystems, Inc., "Netra ft 1800 Module EEPROM v.4 Data File Specifications, Motherboard-Specific Data," 1998, 6 pages.
Sun Microsystems, Inc., "Netra ft 1800 Module EEPROM v.4 Data File Specifications, CPUset-Specific Data," 1998, 9 pages.
Sun Microsystems, Inc., "Netra ft 1800 Module EEPROM v.4 Data File Specifications, Generic Data-All Modules," 1998, 20 pages.
"eeprom—display or alter information in a hardware module's eeprom," facsimile received on Jan. 31, 2003, printed on May 19, 1993. 2 pages.
JP2002250578, Abstract, "Refrigerating Container," Sep. 6, 2002, 5 pages.
William K. Hogan, et al., "SMT Connectors for Removable Small-Form-Factor Transceiver Modules," 2000 Electronic Components and Technology Conference, IEEE, pp. 1164-1172.
Lisa Spainhower, et al., Design for Fault-Tolerant in System ES/9000 Model 900, 1992 IEEE, pp. 38-47.
P.L. Hunter, et al., "Fault Tolerant, Hot-Pluggable Power System Design," 1994 IEEE, pp. 815-822.
"ON-Field Replaceable Unit Identification and Error Storage," IBM Technical Disclosure Bulletin, Sep. 1, 1994, vol. 37, Issue 9, 3 pages.
"Data Mining 101," aboutAI.net, Aug. 6, 2000, 3 pages.
Microsoft Computer Dictionary, Copyright 2002, Microsoft Press, Fifth Edition, p. 575.
Perl for System Administration by David Blank-Edelman, Published by O'Reilly 2000, ISBN: 1565926099.
Engineering Statistics Handboo, http://www.itl.nist.gov/div898/handbook/apr/section2/apr234.htm, Oct. 29, 2000 version found via the Way Back Machine.
Engineering Documentation Control Handbook (2$^{nd}$ Edition) by F.B. Watts, Published by William Andrew Publishing/Noyes 2000, ISBN:0-8155-1446-8.
Nebraska Dept. of Education General Glossary, http://www.nde/state/ne/us/READ/FRAMEWORK/glossary/general _p-t.html, Jan. 29, 2002 version found via the Way Back Machine.

* cited by examiner

FIELD REPLACEABLE UNIT (FRU) IDENTIFICATION SYSTEM TOOL

This patent application claims benefit of priority to U.S. Provisional Patent Application Ser. No. 60/381,130, filed on May 17, 2002. This patent application claims benefit of priority to U.S. Provisional Patent Application Ser. No. 60/381,116, filed on May 17, 2002. This patent application claims benefit of priority to U.S. Provisional Patent Application Ser. No. 60/381,386, filed on May 17, 2002. This patent application claims benefit of priority to U.S. Provisional Patent Application Ser. No. 60/381,131, filed on May 17, 2002. This patent application claims benefit of priority to U.S. Provisional Patent Application Ser. No. 60/381,399, filed on May 17, 2002. This patent application claims benefit of priority to U.S. Provisional Patent Application Ser. No. 60/381,400, filed on May 17, 2002. The above applications are incorporated herein by reference in their entireties.

BACKGROUND OF THE INVENTION

1. Field of the Invention

This invention relates generally to a processor-based computer system and, more particularly, to a field replaceable unit (FRU) identification system tool.

2. Description of the Related Art

The last several years have witnessed an increased demand for network computing, partly due to the emergence of the Internet. Some of the notable trends in the industry include a boom in the growth of Applications Service Providers (ASPs) that provide applications to businesses over networks and enterprises that use the Internet to distribute product data to customers, take orders, and enhance communications with employees.

Businesses typically rely on network computing to maintain a competitive advantage over other businesses. As such, developers, when designing processor-based systems for use in network-centric environments, may take several factors into consideration to meet the expectation of the customers, factors such as the functionality, reliability, scalability, and performance of such systems.

One example of a processor-based system used in a network-centric environment is a mid-frame server system. Typically, mid-frame servers are employed in high bandwidth systems requiring high availability factors. Minimizing system downtime is an important system management goal, as downtime generally equates to significant lost revenue. Typically, such computer systems are provided with replaceable components or modules that may be removed and/or installed without shutting down the system. This on-line replacement capability is commonly referred to as a hot-pluggable or hot-swappable environment.

Unlike current desktop computer systems, in which the internal cards and devices are essentially disposable (i.e., they are replaced if they fail, and the defective part is discarded without repair), the individual components used to construct higher end systems, such as the mid-frame server described above, are typically returned to the manufacturer or a third-party vendor associated with the manufacturer for repair. Repaired units are then reinstalled in the same or in a different mid-frame server. Such repairable components are commonly referred to as field replaceable units (FRUs). In the service life of a particular FRU, it may be installed in multiple servers owned by different customers. Exemplary units that may be field replaceable are system control boards, processing boards, memory modules installed on one of the processing boards, input/output (I/O) boards, power supplies, cooling fans, and the like.

Throughout the service life of a particular FRU, it may be serviced by different repair entities and installed in different customer facilities. Because of the different entities involved during the service life of the FRU, it is difficult to maintain accurate and retrievable records for the individual FRUs. Different databases including information about the FRU may not be centralized or even available.

SUMMARY OF THE INVENTION

One aspect of the present invention is seen in a method including interfacing with a field replaceable unit (FRU) having a memory device configured to store a FRUID image including at least status data. The status data is extracted from the memory device. Repair information associated with a repair of the field replaceable unit is received. The repair information is stored in the memory device.

Another aspect of the present invention is seen in a system including a field replaceable unit (FRU) and a FRU tool. The FRU includes a memory device configured to store a FRUID image including at least status data. The FRU tool is configured to interface with the FRU, extract the status data from the memory device, receive repair information associated with a repair of the field replaceable unit, and store the repair information in the memory device.

BRIEF DESCRIPTION OF THE DRAWINGS

The invention may be understood by reference to the following description taken in conjunction with the accompanying drawings, in which like reference numerals identify like elements, and in which.

Figure 1:
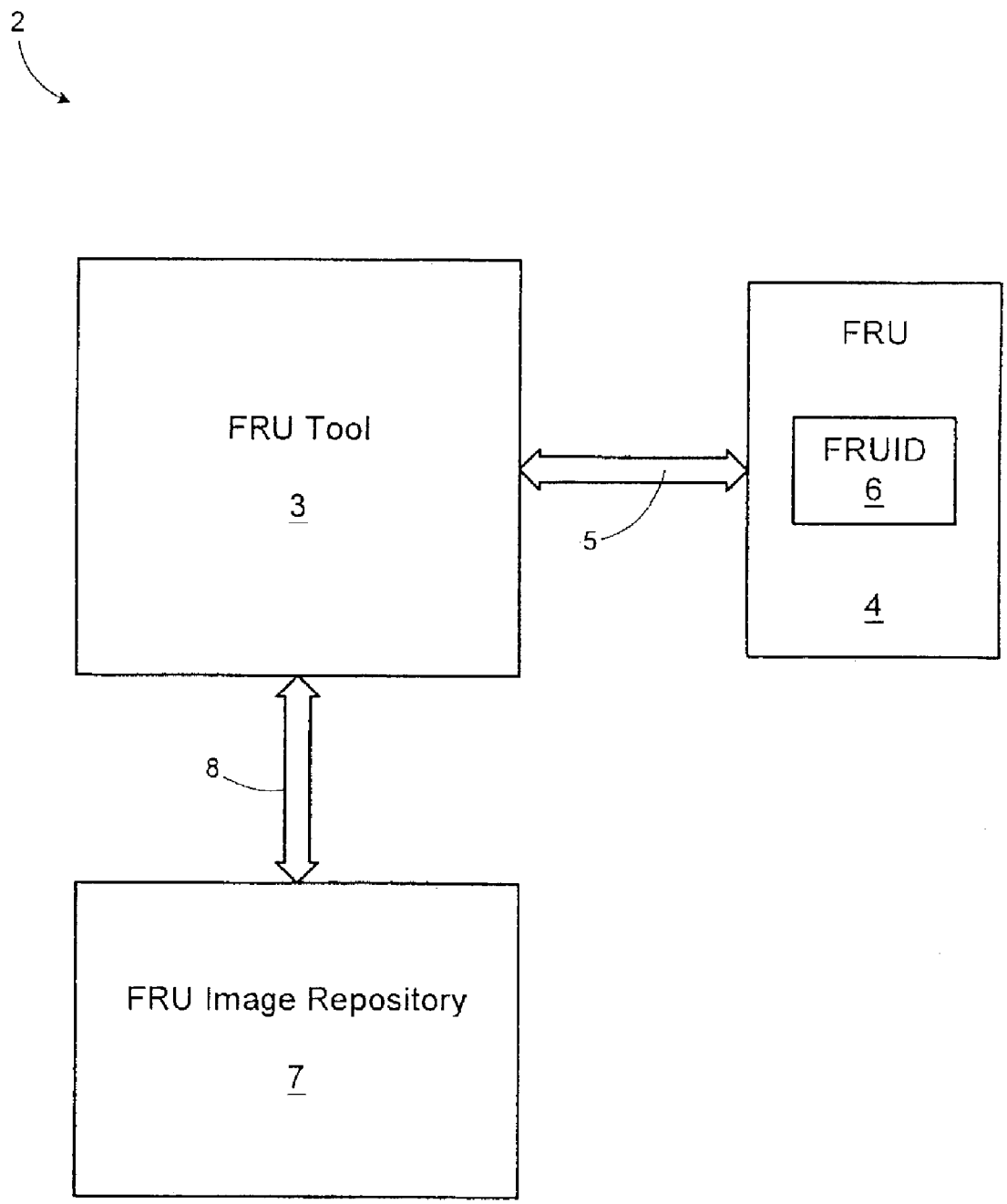
FIG. 1 is a simplified block diagram of a repair system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, and/or magnetic signals capable of being stored, transferred, combined, compared, and otherwise manipulated. It has proven convenient at times, principally for reasons of common usage, to refer to these signals as bits, values, elements, symbols, characters, terms, numbers, and the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" and the like, refer to the action and processes of a computer system, or similar electronic computing device, that manipulates and transforms data represented as physical, electronic quantities within the computer system's registers and/or memories into other data similarly represented as physical quantities within the computer system memories and/or registers and/or other such information storage, transmission and/or display devices.

The programming instructions necessary to implement these software functions may be resident on various storage devices. Such storage devices referred to in this discussion may include one or more machine-readable storage media for storing data and/or instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, and/or modules in the various systems may be stored in respective storage devices. The instructions, when executed by a respective control unit, cause the corresponding system to perform programmed acts as described.

Referring now to FIG. 1, a simplified block diagram of a repair system 2 is provided. The repair system 2 may be implemented in a repair facility for servicing and/or upgrading field replaceable units (FRUs). The repair system 2 includes a FRU tool 3 interfacing with a FRU 4. The FRU 4 may be installed in the FRU tool 3 or coupled to the FRU tool 3 through an external interface 5. The FRU 4 is equipped with a FRU identification (FRUID) memory 6 for storing data regarding the associated FRU 4, such as identification data and data regarding its service and operating history. Components received for repair or upgrade may be installed in the FRU tool 3 and data stored on their respective FRUIDs 6 may be extracted and/or modified. The FRU tool 3 may or may not be the same type of system in which the FRU 4 had been previously installed. The FRU tool 3 may have various implementations and capabilities. The FRU tool 3 may be configured to interface with a FRUID Image Repository (FIR) 7 for storage of images from the FRU 4 and other FRUs maintained under the control of the provider of the systems in which the FRUS are installed. The FIR 7 may be located at a site remote from the repair facility including the FRU tool 3, and a communication link 8 may be provided for transferring the FRUID images between the FRU tool 3 and the FIR 7. For example, the FRUID images may be transferred using a modem connection, a network connection, or an internet connection. An exemplary technique for implementing the FIR 7 is described in greater detail in U.S. Provisional Patent Application Ser. No. 60/381,399, incorporated above.

Figure 2:
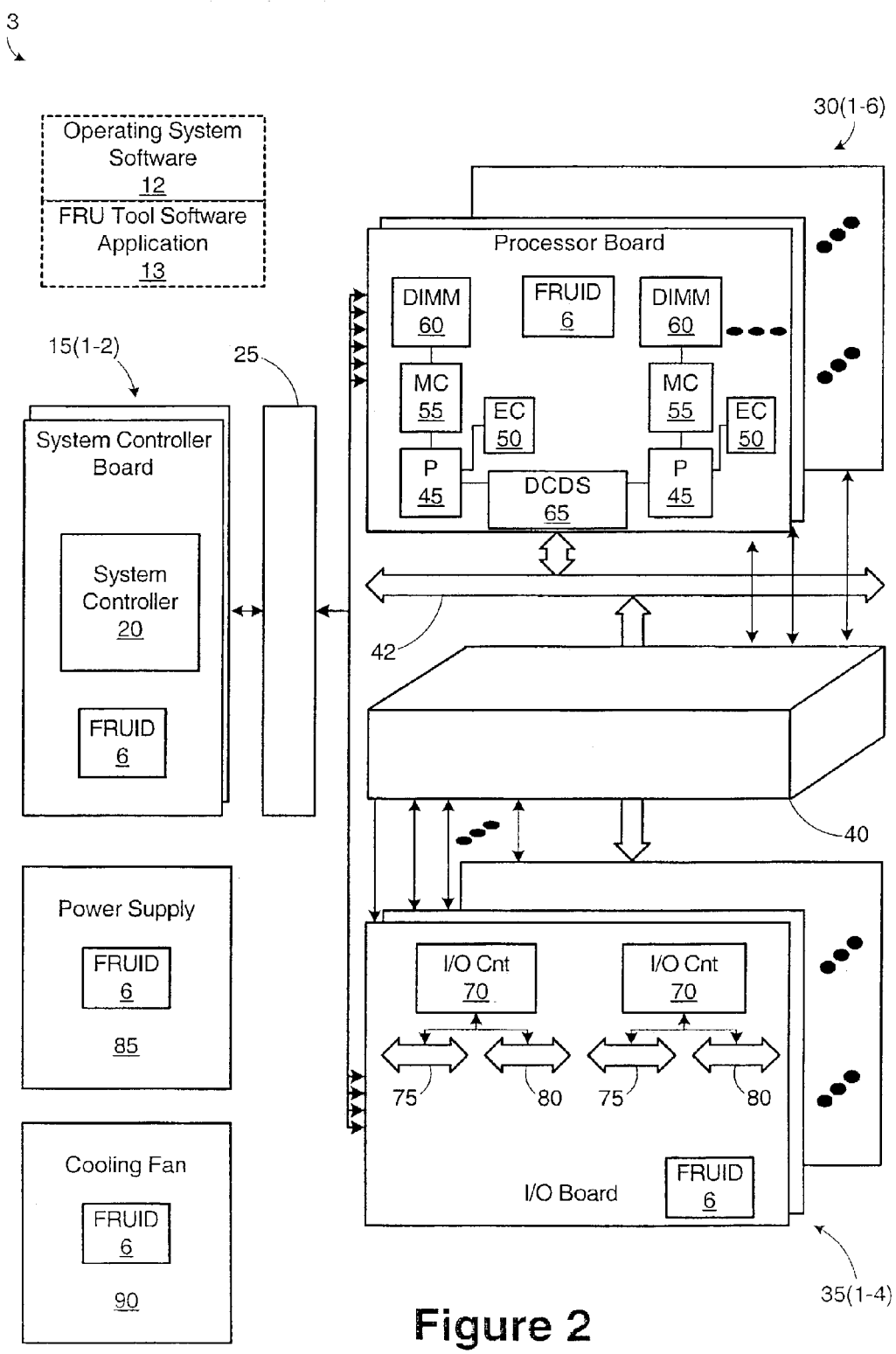
FIG. 2 is a simplified block diagram of a field replaceable unit (FRU) tool in accordance with one embodiment of the present invention.

Turning now to FIG. 2, a simplified block diagram of the FRU tool 3 in accordance with one embodiment of the present invention is illustrated. In the illustrated embodiment, the FRU tool 3 is a computer system adapted to run under an operating system 12, such as the Solaris™ operating system offered by Sun Microsystems, Inc. of Palo Alto, Calif. As described above, FRUs 4 received at a repair facility may be installed in the FRU tool 3 as internal components or connected through external interfaces. The repaired or modified FRU 4 may be then returned to its previous installation or placed into stock for future installations. The FRU tool 3 executes a FRUTool software application 13 for accessing the data stored on the FRUID 6.

The FRU tool 3, in one embodiment, includes a plurality of system control boards 15(1-2), each including a system controller 20, coupled to a console bus interconnect 25. The system controller 20 may include its own microprocessor and memory resources. The FRU tool 3 also includes a plurality of processing boards 30(1-6) and input/output (I/O) boards 35(1-4). The processing boards 30(1-6) and I/O boards 35(1-4) are coupled to a data interconnect 40 and a shared address bus 42. The processing boards 30(1-6) and I/O boards 35(1-4) also interface with the console bus interconnect 25 to allow the system controller 20 access to the processing boards 30(1-6) and I/O boards 35(1-4) without having to rely on the integrity of the primary data interconnect 40 and the shared address bus 42. This alternative connection allows the system controller 20 to operate even when there is a fault preventing main operations from continuing.

In the illustrated embodiment, the FRU tool 3 is capable of supporting 6 processing boards 30(1-6) and 4 I/O boards 35(1-4). However, the invention is not limited to such an exemplary implementation, as any number of such resources may be provided. Also, the invention is not limited to the particular architecture of the FRU tool 3.

For illustrative purposes, lines are utilized to show various system interconnections, although it should be appreciated that, in other embodiments, the boards 15(1-2), 30(1-6), 35(1-4) may be coupled in any of a variety of ways, including by edge connectors, cables, and/or other available interfaces.

In the illustrated embodiment, the FRU tool 3 includes two control boards 15(1-2), one for managing the overall operation of the FRU tool 3 and the other for providing redundancy and automatic failover in the event that the other board 15(1-2) fails. Although not so limited, in the illustrated embodiment, the first system control board 15(1)

serves as a "main" system control board, while the second system control board 15(2) serves as an alternate hot-swap replaceable system control board.

The main system control board 15(1) is generally responsible for providing system controller resources for the FRU tool 3. If failures of the hardware and/or software occur on the main system control board 15(1) or failures on any hardware control path from the main system control board 15(1) to other system devices occur, system controller failover software automatically triggers a failover to the alternative control board 15(2). The alternative system control board 15(2) assumes the role of the main system control board 15(1) and takes over the main system controller responsibilities. To accomplish the transition from the main system control board 15(1) to the alternative system control board 15(2), it may be desirable to replicate the system controller data, configuration, and/or log files on both of the system control boards 15(1-2). During any given moment, generally one of the two system control boards 15(1-2) actively controls the overall operations of the FRU tool 3. Accordingly, the term "active system control board," as utilized hereinafter, may refer to either one of the system control boards 15(1-2), depending on the board that is managing the operations of the FRU tool 3 at that moment.

For ease of illustration, the data interconnect 40 is illustrated as a simple bus-like interconnect. However, in an actual implementation the data interconnect 40 is a point-to-point switched interconnect with two levels of repeaters or switches. The first level of repeaters is on the various boards 30(1-6) and 35(1-4), and the second level of repeaters is resident on a centerplane (not shown). The data interconnect 40 is capable of such complex functions as dividing the system into completely isolated partitions and dividing the system into logically isolated domains, allowing hot-plug and unplug of individual boards.

In the illustrated embodiment, each processing board 30(1-6) may include up to four processors 45. Each processor 45 has an associated e-cache 50, memory controller 55 and up to eight dual in-line memory modules (DIMMs) 60. Dual CPU data switches (DCDS) 65 are provided for interfacing the processors 45 with the data interconnect 40. Each pair of processors 45 (i.e., two pairs on each processing board 30(1-6)) share a DCDS 65. Also, in the illustrated embodiment, each I/O board 35(1-4) has two I/O controllers 70, each with one associated 66-MHz peripheral component interface (PCI) bus 75 and one 33-MHz PCI bus 80. The I/O boards 35(1-4) may manage I/O cards, such as peripheral component interface cards and optical cards, that are installed in the FRU tool 3.

In the illustrated embodiment, the processors 45 may be UltraSPARCIII™ processors also offered by Sun Microsystems, Inc. The processors are symmetric shared-memory multiprocessors implementing the UltraSPARC III protocol. Of course, other processor brands and operating systems 12 may be employed.

Selected modules in the FRU tool 3 are designated as FRUs 4 and are equipped with FRUID memories 6. Exemplary FRUs so equipped may include the system controller boards 15(1-2), the processing boards 30(1-6), and the I/O boards 35(1-4). The FRU tool 3 may also include other units, such as a power supply 85 (interconnections with other devices not shown), a cooling fan 90, and the like, equipped with FRUIDs 6, depending on the particular embodiment. The FRU tool 3 may be configured to allow hot or cold swapping of the field replaceable units.

Figure 3:
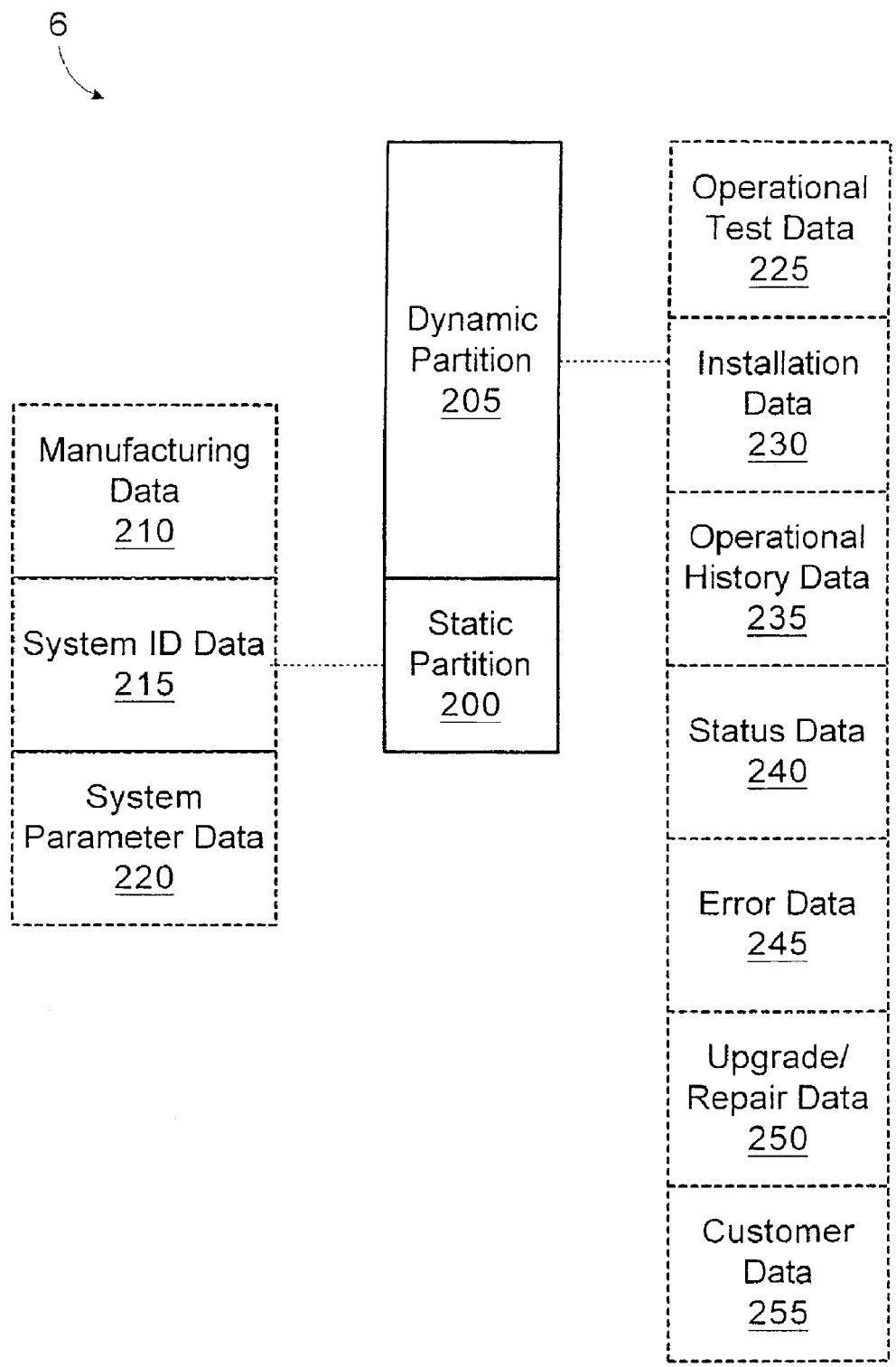
FIG. 3 is a diagram of a field replaceable unit identification (FRUID) memory.

Turning now to FIG. 3, a simplified diagram of the FRUID 6 is provided. In the illustrated embodiment, the FRUID 6 is a serial electrically erasable programmable read-only memory (SEEPROM) and has an 8 Kbyte space to store information about the associated FRU. Of course, other memory types and storage sizes may be used depending on the particular implementation. The FRUID 6 includes a 2 Kbyte static partition 200 dedicated to store "static" information and a 6 Kbyte dynamic partition 205 to store "dynamic" information. Certain data is intended to remain in the FRUID 6 throughout its service life (i.e., lifetime duration), while other data is only intended to remain during a single installation of the FRU 4 (i.e., field duration). Data with a field duration may be erased or set to a default value prior to shipping the FRU 4 to a different installation. Certain data with a field duration, as will be described in greater detail below) may also be accumulated with field data from previous installations using cumulative records. The storage life of the various data is described in greater detail below.

The static information includes:
Manufacturing Data 210;
System ID Data 215; and
System Parameter Data 220.
The dynamic information includes:
Operational Test Data 225;
Installation Data 230;
Operational History Data 235;
Status Data 240;
Error Data 245;
Upgrade Repair Data 250; and
Customer Data 255.

The particular format for storing data in the FRUID 6 is described in greater detail in U.S. Provisional Patent Application Ser. No. 60/381,400, incorporated above.

Some of the benefits derived from the information stored in the FRUID 6 are:
Fatal Error Identification—a fatal error bit may be set on FRU failure and will remain set until after the FRU has been repaired and reset by the repair depot to prevent "accidental" reuse of the failed FRU;
Ease of Tracking Errors—in the event the FRU has been "repaired" and returned to the field, and failed again subsequently with the same or similar failure, the failure log is tagged to insure special attention will be given to the failed FRU;
Trend Analysis—quick identification of certain batch of FRUs with known defects can be done by a serial number embedded into the SEEPROM;
Trend Analysis—quick analysis can be performed by collecting information of specific FRUs, including power-on hours, temperature logs, and the like;
Trend Analysis—quick identification of components from specific vendors on premature failures of certain FRUs; and
Field Change Orders can be applied easily with patches after identifying the range of affected FRU by serial numbers.

Figure 4:
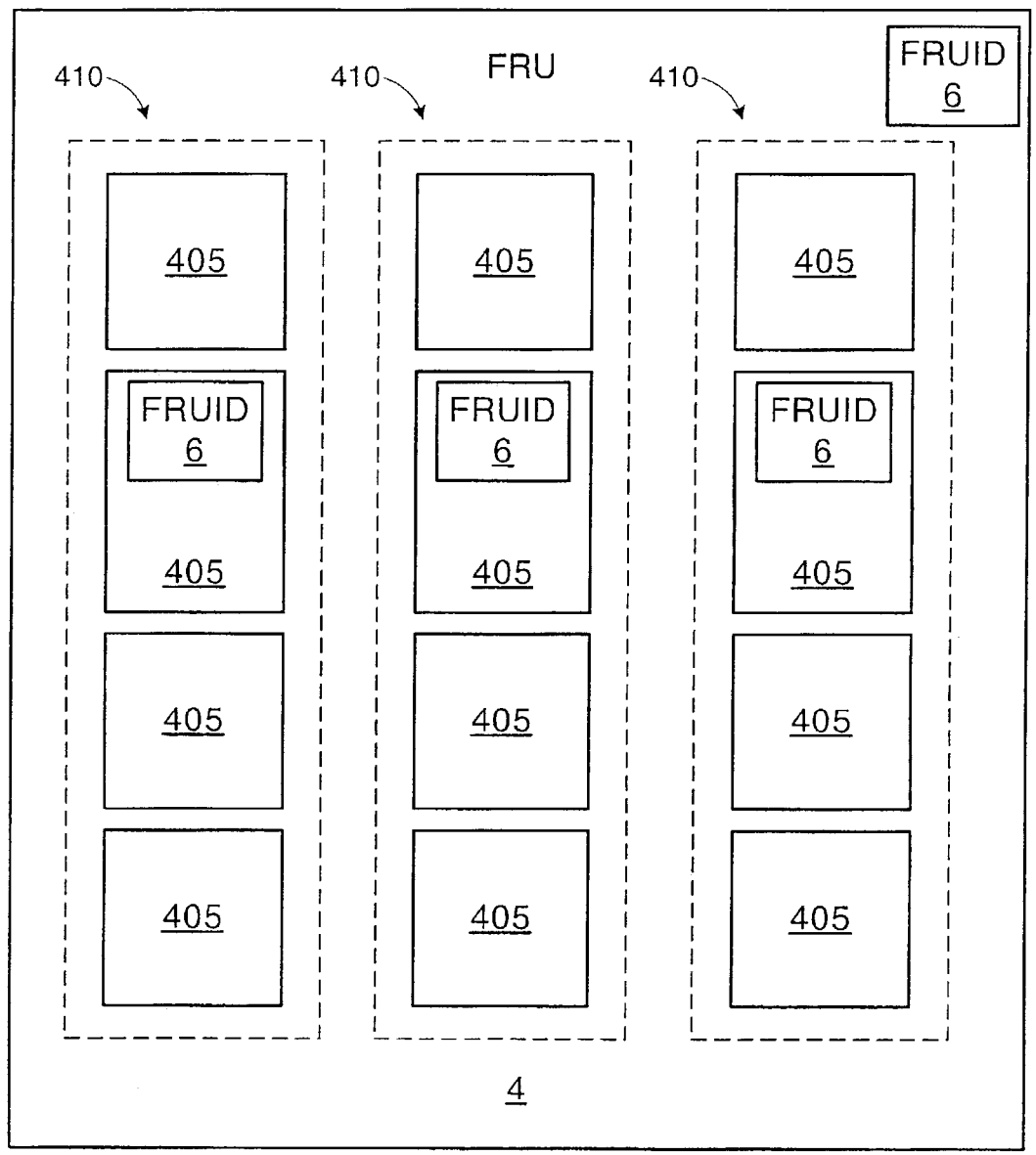
FIG. 4 is a simplified block diagram illustrating a field replaceable unit (FRU) having a plurality of submodules.

Referring now to FIG. 4, a simplified block diagram of an exemplary FRU 4 having a FRUID 6 is shown. As described above, the FRU 4 may represent one of the system control boards 15(1-2), one of the processing boards 30(1-6), one of the input/output (I/O) boards 35(1-4), the power supply 85, the cooling fan 90, and the like. The FRU 4 includes a plurality of submodules 405. For example, the FRU 4 may be a processing board 30(1-6), and the submodules 405 may be the processors 45, e-caches 50, memory controllers 55, and DIMMs 60. Selected submodules 405 (e.g., the DIMMS 60) may also be themselves field replaceable and have their own FRUIDs 6. The submodules 405 may be organized into groups 410. For example, a processor 45 and its associated e-cache 50, memory controller 55, and DIMMS 60 may be organized into a single group 410.

Returning to FIG. 3, the data stored in the static partition 200 and dynamic partition 210 is now described in greater detail. The particular types of static and dynamic data stored in the FRUID 6 that are detailed herein are intended to be exemplary and non-exhaustive. Additional static and dynamic data may be stored in the FRUID 6 depending on the particular implementation. The information stored in the static partition 200 is typically information that is not expected to change over the service life of the FRU 4, while the dynamic data includes data that is written to the FRUID 6 during its service life.

The manufacturing data 210 may include information such as the part number, serial number, date of manufacture, and vendor name. The system ID data 215 may include information such as an ethernet address and a system serial number (i.e., of the system in which the FRU is installed). The system parameter data 220 may include information about the system, such as maximum speed, DIMM speed, maximum power, and the like.

The operational test data 225 provides information about the most recent iteration of tests performed on the FRU 4. The operational test data 225 is typically written during the manufacture of the FRU 4 or while it is being repaired, not while the FRU 4 is in the field. When the FRU 4 is received at a repair depot, the operational test data 225 may be accessed to determine which tests had been previously run on the FRU 4. For each of the possible tests that may be run on the FRU 4, a summary record may be provided that indicates when the test was performed and the revision of the testing procedure used. The detailed operational test data 225 may be captured and cleared prior to shipping the FRU 4 for installation, but the summary record detailing the last tests performed may be retained.

The installation data 230 specifies where the FRU 4 has been used, including the system identity and details of the parent FRU (i.e., the FRU in which the current FRU 4 is installed). The installation data 230 may also include geographical data (e.g., latitude, longitude, altitude, country, city or postal address) related to the installation. The installation data 230 typically has a field duration.

The operational history data 235 includes data related to selected parameters monitored during the service life of the FRU 4. For example, the operational history data 235 may include power events and/or temperature data.

Power on and off events are useful in reconstructing the usage of the FRU 4. The power event data could indicate whether the FRU 4 was placed in stock or installed in a system and shipped. The idle time would indicate the shelf life at a stocking facility before use. The time interval between a fatal error and a power on at a repair center could be used to track transit time. The total on time could be used to generate a mean time before failure metric or a mean time before fatal error metric. Detailed power event records may have a field duration. A cumulative power history record having an indefinite duration may be used to accumulate the power history across different installations of the FRU 4. The power information stored for the current installation may be accumulated with other power history data from previous installations.

Temperature data is useful for analyzing service life and failure rates. Failure rate is often directly dependent on temperature. Various aging mechanisms in the FRU 4 run at temperature controlled rates. Cooling systems are generally designed based on predicted failure rates to provide sufficient cooling to keep actual failure rates at an acceptable level. The temperature history may be used for failed components to determine whether predicted failure rates are accurate. Temperature history can affect failure rate both by aging and by failure mechanisms unrelated to aging. Minimum and maximum operating temperatures are recorded to establish statistical limits for the operating range of the FRU 4. Temperature values are grouped into bins, with each bin having a predetermined range of temperatures. The count of time in each temperature bin defines the temperature history of the operating environment. A last temperature record may be used to approximate the temperature of the FRU 4 when it failed. Temperature data from one FRU 4 may be compared to the histories of other like FRUs to establish behavior patterns. Failure histories may be used to proactively replace temperature-sensitive parts. An indefinite cumulative temperature history record may be used to accumulate the temperature history across different installations of the FRU 4. The temperature information stored for the current installation may be accumulated with other temperature history data from previous installations, and the temperature records with a field duration may be erased.

The status data 240 records the operational status of the FRU 4 as a whole, including whether it should be configured as part of the system or whether maintenance is required. If maintenance is required, a visible indication may be provided to a user by the system. Exemplary status indications include out-of-service (OOS), maintenance action required (MAR), OK, disabled, faulty, or retired. A human-supplied status bit may be used to indicate that the most recent status was set by human intervention, as opposed to automatically by the system. A partial bit may also be used to indicate while the entire FRU 4 is not OOS, some components on the FRU 4 may be out-of-service or disabled. If the system sees the partial bit checked, it checks individual component status bits to determine which components are OOS or disabled. The status data 240 may also include a failing or predicted failing bit indicating a need for maintenance. Typically, the status data 240 related to the current status has an indefinite duration, but status event data that records status changes may have a field duration.

The error data 245 includes soft errors from which the system was able to recover. These soft errors include error checking and correction (ECC) errors that may or may not be correctable. The type of error (e.g., single bit or multiple bits) may also be recorded. A rate-limit algorithm may be used to change the status of the FRU 4 to faulty if more than N errors occur within a FRU-specific time interval, T. Typically, the error data 245 has a field duration.

The upgrade/repair data 250 includes the upgrade and repair history of the FRU 4. The repair records include repair detail records, a repair summary record, and an engineering change order (ECO) record. Typically, the repair records are updated at a repair depot when a repair is completed on the FRU 4. The repair information stored on the FRUID 6 may also include the number of times a returned FRU 4 is not diagnosed with a problem. During a repair operation, one or more engineering change orders (ECOs) may be performed on the FRU 4 to upgrade its capability (e.g., upgrade a processor 45) or to fix problems or potential problems identified with the particular FRU 4 model. For example, a firmware change may be implemented or a semiconductor chip (e.g., application specific integrated circuit (ASIC)) may be replaced. Typically, the upgrade/repair data 250 has an indefinite duration.

The customer data 255 is generally a free-form field in which the customer may choose to store any type of desired information, such as an asset tag, the customer's name, etc. The customer data 255 may be updated at the customer's discretion. Typically, the customer data 255 has a field duration.

Figure 5:
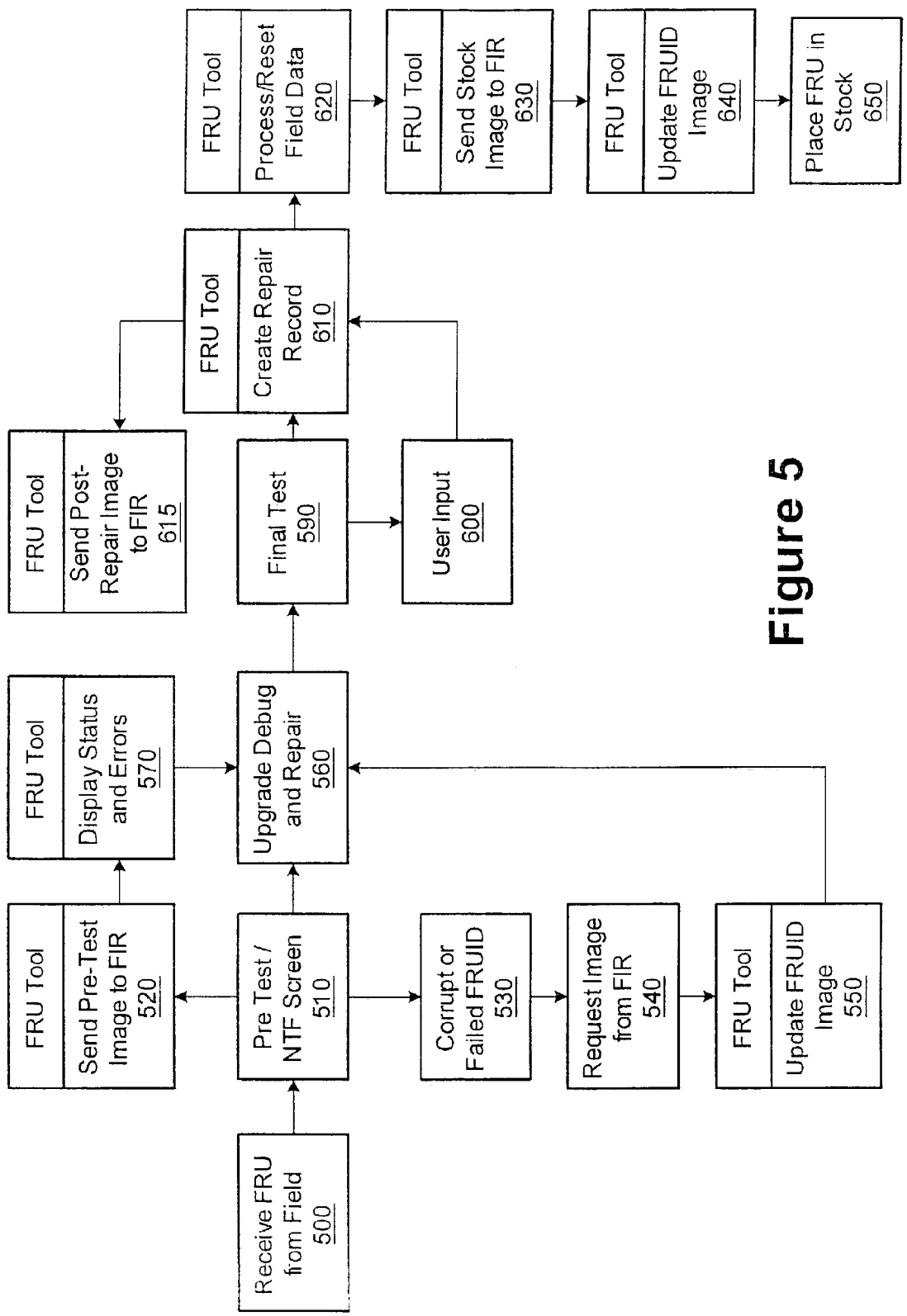
FIG. 5 is a simplified flow diagram of a method for storing static and dynamic information for a field replaceable unit in accordance with another embodiment of the present invention.

Turning now to FIG. 5, a simplified diagram illustrating the interface between the FRU tool 3 and the FRU 4 during a repair or upgrade evolution is provided. In block 500, the FRU 4 is received from the field. The FRU 4 may be received due to a fault condition with the FRU 4 or a need for an upgrade. In block 510, a pre-test may be performed on the FRU 4 to determine if it is operating properly. If no problems are identified, a no trouble found (NTF) condition may be indicated. At the time of the pretest, the FRU tool 3 captures the image stored in the FRUID 6 and queues the pre-test image for transfer to the FIR 7 (see FIG. 1) in block 520. If the FRUID 6 is corrupt or failed in block 530, the most recent FRUID image archived in the FIR may be requested in block 540, and the FRU tool 3 may update the FRUID 6 with the archived image in block 550.

The upgrade, debug, and repair process occurs in block 560. The FRU tool 3 provides the status data 240 and error data 245 extracted from the FRUID image in block 570. Such data is useful for determining the nature of the problem associated with the FRU 4 necessitating its repair. If a problem with the FRU 4 prevents extraction of the pre-test FRUID image, it may be extracted after a repair has been performed in block 560 and transferred to the FIR 7 in block 520. The FRU 4 passes to a final test stage at block 590. User input associated with the repair or upgrade activity is provided in block 600, and the FRU tool 3 creates a repair record detailing the repair/upgrade activity and stores the record on the FRUID 6 in block 610 and transfers a port-repair FRUID image to the FIR 7 in block 615. For example, a user may select from a plurality of predefined repair or upgrade activities using a drop-down list. Based on the selection, the FRU tool 3 may generate the repair information and store the repair record in the FRUID 6. The particular makeup of the repair/upgrade records is described in greater detail U.S. Provisional Patent Application Ser. No. 60/381,386, incorporated above.

In block 620, data in the FRUID image is processed and/or reset to default values. For example, records having a field duration may be erased or set to default values. Temperature and power data may be accumulated in cumulative summary fields, and the status and error data may be cleared. Following the processing in block 620, the FRU tool 3 sends the updated stock FRUID image for archival in the FIR 7 in block 630 and updates the image stored in the FRUID 6 in block 640. Subsequently, the FRU 4 is placed in stock in block 650, and the repair upgrade process completes.

Storage of information on the FRUID 6 and retrieval of that information during repair activities provides advantages related to fault diagnosis and record keeping. Much of the important information associated with the service life of the FRU 4 is contained within the FRUID 6, and is thus always available with the device. Information related to operational history, problems, repairs, upgrades, etc. remains retrievable.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   interfacing with a field replaceable unit (FRU) having a memory device configured to store a FRUID image including at least status data and wherein the FRUID image includes data having a field duration;
   extracting the status data from the memory device;
   receiving repair information associated with a repair of the FRU;
   resetting at least a portion of the data having the field duration; and
   storing the FRUID image including the data reset and further including the repair information in the memory device of the FRU.

2. The method of claim 1, wherein the FRUID image further includes error data, and the method further comprises retrieving the error data.

3. The method of claim 1, further comprising:
   extracting the FRUID image from the memory device; and
   transferring the extracted FRUID image to an image repository prior to storing the repair information.

4. The method of claim 1, further comprising:
   extracting the FRUID image from the memory device; and
   transferring the extracted FRUID image to an image repository after storing the repair information.

5. The method of claim 1, further comprising:
   identifying a fault condition with the FRUID image;
   requesting an archived FRUID image from an image repository;
   receiving the archived FRUID image; and
   storing the archived FRUID image in the memory device.

6. The method of claim 1, wherein resetting the data further comprises resetting at least one of installation data, power data temperature data, error data, status data, and customer data included in the FRUID image.

7. The method of claim 1, wherein resetting the data further comprises clearing at least a portion of the data having the field duration.

8. The method of claim 1, wherein resetting the data further comprises resetting at least a portion of the data having the field duration to a default value.

9. The method of claim 1 further comprising aggregating at least a portion of the data having the field duration in a cumulative record included in the FRUID image prior to resetting the data having the field duration.

10. The method of claim 9, wherein aggregating the portion of the data further comprising aggregating power data included in the FRUID image.

11. The method of claim 9, wherein aggregating the portion of the data further comprising aggregating temperature data included in the FRUID image.

12. The method of claim 1, further comprising transferring the FRUID image including the data reset to an image repository.

13. A system comprising:
    a field replaceable unit (FRU) including a memory device configured to store a FRUID image including at least status data; and
    a FRU tool configured to interface with the FRU, extract the status data from the memory device, receive repair information associated with a repair of the field replaceable unit, and store the repair information in the memory device, wherein the FRUID image includes data having a field duration, and the FRU tool is further configured to reset the data having the field duration and store the FRUID image including the data reset in the memory device.

14. The system of claim 13, wherein the FRUID image further includes error data, and the FRU tool is further configured to retrieve the error data.

15. The system of claim 13, wherein the FRU tool is further configured to extract the FRUID image from the memory device and transfer the extracted FRUID image to an image repository prior to storing the repair information.

16. The system of claim 13, wherein the FRU tool is further configured to extract the FRUID image from the memory device and transfer the extracted FRUID image to an image repository after storing the repair information.

17. The system of claim 13, wherein the FRU tool is further configured to identify a fault condition with the FRUID image, request an archived FRUID image from an image repository, receive the archived FRUID image, and store the archived FRUID image in the memory device.

18. The system of claim 13, wherein the FRU tool is further configured to reset at least one of installation data, power data temperature data, error data, status data, and customer data included in the FRUID image.

19. The system of claim 13, wherein the FRU tool is further configured to clear at least a portion of the data having the field duration.

20. The system of claim 13, wherein the FRU tool is further configured to reset at least a portion of the data having the field duration to a default value.

21. The system of claim 13, wherein the FRU tool is further configured to aggregate at least a portion of the data having the field duration in a cumulative record included in the FRUID image prior to resetting the data having the field duration.

22. The system of claim 21, wherein the FRU tool is further configured to aggregate power data included in the FRUID image.

23. The system of claim 21, wherein the FRU tool is further configured to aggregate temperature data included in the FRUID image.

24. The system of claim 13, wherein the FRU tool is further configured to transfer the FRUID image including the data reset to an image repository.

* * * * *